United States Patent [19]

Rees et al.

[11] 4,268,240

[45] May 19, 1981

[54] ACTUATING MECHANISM FOR GATE VALVE OF INJECTION NOZZLE

[75] Inventors: Herbert Rees, Willowdale; Robert D. Schad, Schomberg, both of Canada

[73] Assignee: Husky Injection Molding Systems, Bolton, Canada

[21] Appl. No.: 42,348

[22] Filed: May 25, 1979

Related U.S. Application Data

[62] Division of Ser. No. 867,506, Jan. 6, 1978, Pat. No. 4,173,448.

[51] Int. Cl.³ .............................. B29F 1/03; B29F 1/08
[52] U.S. Cl. .................................... 425/548; 425/549; 425/566; 425/570
[58] Field of Search ............... 425/548, 549, 564, 566, 425/568, 570

[56] References Cited

U.S. PATENT DOCUMENTS

| | | | |
|---|---|---|---|
| 3,037,245 | 6/1962 | Darnell | 425/562 |
| 3,530,539 | 9/1970 | Gellert | 425/562 X |
| 3,716,318 | 2/1973 | Erik | 425/550 |
| 3,849,048 | 11/1974 | Bielfeldt | 425/567 |

*Primary Examiner*—Thomas P. Pavelko

*Attorney, Agent, or Firm*—Karl F. Ross

[57] ABSTRACT

An injection gate of a mold cavity comprises an elongate valve rod which passes axially through a flow channel for molten plastic material and is guided in an extension of a thin-walled steel cylinder open at its opposite end toward an adjoining manifold plate. The rod extremity remote from the gate is secured to a tubular neck of a piston inside the cylinder whose stroke length is a fraction of the axial height of the cylinder's interior, a clearance around this neck providing space for drooling plastic while the length of the neck and of the peripheral cylinder wall serves for thermally insulating the manifold plate from the flow channel. The piston has a head sliding within an internal annular shoulder of the cylinder wall, proximal to the manifold plate, which is traversed by axially oriented bores communicating with the aforementioned clearance whereby pressure fluid such as compressed air can be selectively admitted from conduits in the manifold plate to either side of the piston head for reciprocating same together with the valve rod. A plurality of such valve-control pistons can be connected to these conduits in parallel for simultaneous actuation by the air pressure applied thereto.

4 Claims, 2 Drawing Figures

ACTUATING MECHANISM FOR GATE VALVE OF INJECTION NOZZLE

This is a division of application Ser. No. 867,506 filed Jan. 6, 1978, now U.S. Pat. No. 4,173,448, issued Nov. 6, 1979.

FIELD OF THE INVENTION

Our present invention relates to an injection-molding machine of the hot-runner type in which liquefied plastic material, fed from a pressure chamber to an injection gate of a mold cavity, traverses a sprue channel in a heated structure designed to maintain the unused portion of that material in its fluid state for injection in the following cycle. More particularly, this invention is concerned with a valve for alternately blocking and unblocking the injection gate in response to external control signals.

BACKGROUND OF THE INVENTION

Gate valves positively controlled from the outside generally comprise a rod or pin with a free end proximal to the gate and an opposite end secured to the head of a double-acting piston in a cylinder to which air or some other fluid under pressure is alternately admitted from opposite sides. Since the heat generated in the hot-runner structure travels through the valve rod to the piston head, overheating of the piston-and-cylinder assembly must be prevented by maintaining good thermal contact between the cylinder and a massive heat sink such as a cover plate exposed to the ambient atmosphere. To minimize the wasteful dissipation of heat by the cover plate, it is desirable to separate same from the hot-runner structure by an air gap-maintained by spacers of low thermal conductivity. For the sake of compactness, however, the width of that air gap must be limited.

Advantageously, the fluid cylinder itself can be used as such a spacer if its periheral wall is relatively thin to provide the necessary thermal resistance. In that case, however, a considerable heat differential develops along the cylinder axis. Thus, pressure fluid alternately admitted into the cylinder from its cold end and from its hot end may give rise to thermal stresses and may also have a detrimental effect upon the usual packing ring or rings forming a seal between the piston head and the inner cylinder wall.

OBJECTS OF THE INVENTION

An object of our present invention, therefore, is to provide an improved gate-valve construction of the aforedescribed type which avoids the drawback just referred to.

A related object is to provide a simplified conduit system for the supply of pressure fluid from a common source to a plurality of such valves.

SUMMARY OF THE INVENTION

In accordance with our present invention, a fluid cylinder provided with a double-acting piston head for the alternate blocking and unblocking of an injection gate through an associated rod is provided with one or more bores extending generally parallel to the cylinder axis within its peripheral wall, alongside the piston head, from the interior of the cylinder to a face thereof remote from the injection gate and opposite an end wall in which the rod is guided. The cylinder is further provided at that face with an aperture, offset from the bore or bores of the peripheral wall, giving direct access to the piston head. The access aperture, which may be as wide as the piston head itself, and the peripherally located bore or bores are alternately supplied with pressure fluid via respective conduits by the manual or automatic operation of conventional control means such as a solenoid valve. The fluid entering a bore alongside the piston head passes into the interior of the cylinder and bears upon that piston head in a sense retracting its rod from the injection gate, thus unblocking the sprue channel which is then reblocked by fluid reaching the piston directly through the access aperture in the aforementioned cylinder face.

Thus, both the closing and the opening piston strokes are brought about by pressure fluid admitted into the cylinder from the same side, namely its cold and preferably wide-open end remote from the gate. Furthermore, with the piston stroke limited to a minor fraction of the axial length of the peripheral cylinder wall, the piston head will always remain separated from the rod-guiding end wall contacting the hot-runner structure.

The conduits carrying this pressure fluid are advantageously disposed inside a cover plate which contacts the cold end of the cylinder and serves as a heat sink therefor as discussed above. Pursuant to a more particular feature of our invention, that cover plate can be designed as a manifold within which the same fluid channels extend to a plurality of such cylinders whose pistons control the injection gates of several mold cavities supplied with plastic material from a common pressure chamber.

BRIEF DESCRIPTION OF THE DRAWING

The above and other features of our invention will now be described in detail with reference to the accompanying drawing in which.

SPECIFIC DESCRIPTION

Figure 1:
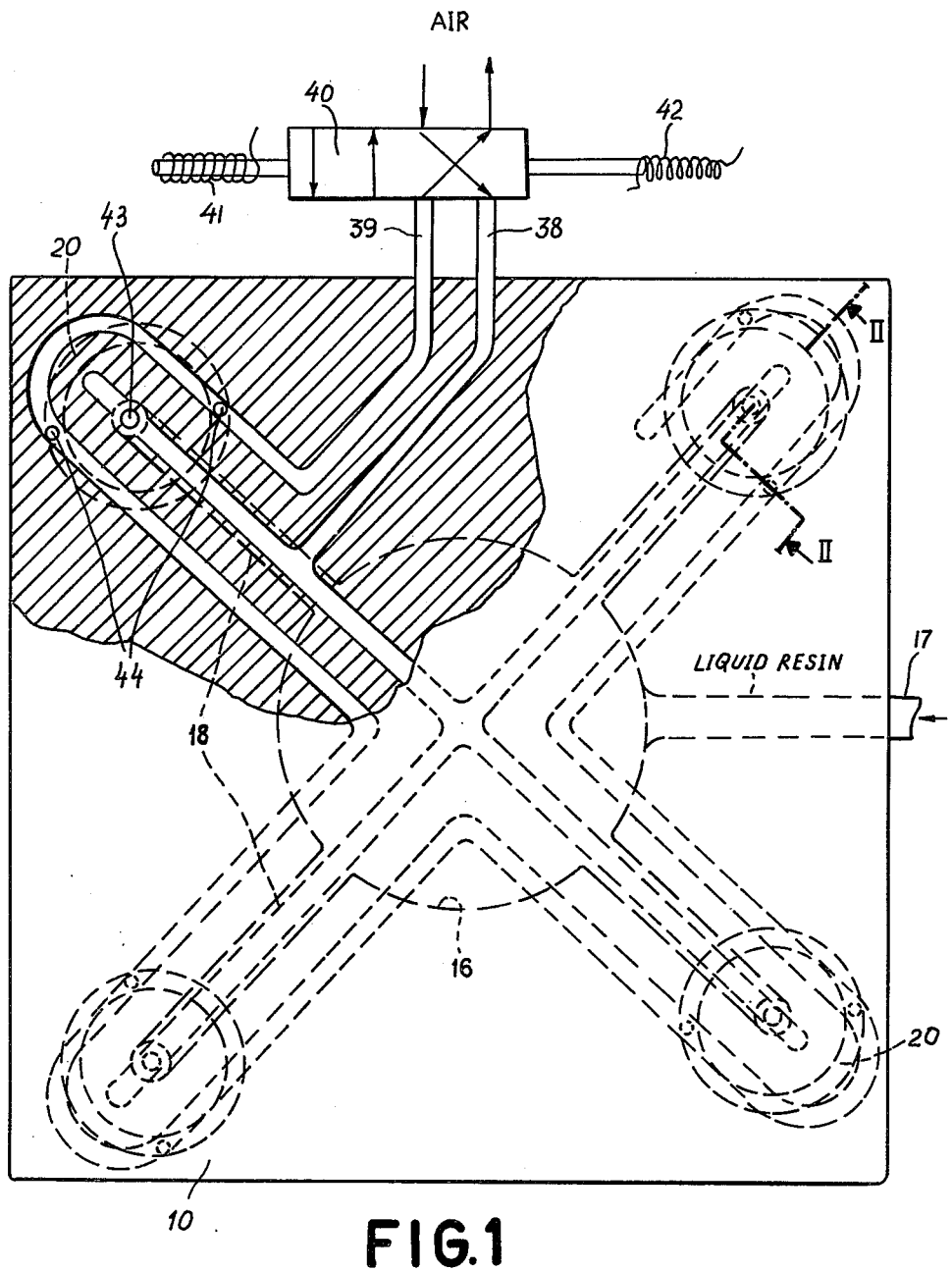
FIG. 1 is a somewhat diagrammatic top view of an array of piston cylinders supplied with pressure fluid through a manifold plate shown partly broken away.

In the drawing we have shown a cover or manifold plate 10 separated from a stationary mold plate 12 by an intermediate or backing plate 11, mold plate 12 defining with a coacting movable mold plate 13 a plurality of cavities 14 (only one shown) each accessible through a gate 15. In the array illustrated in FIG. 1, the several cavities are located at the corners of a square and receive liquefied plastic material from a central pressure chamber 16 into which that material is forced by a nonillustrated plunger via an inlet 17 as is well known per se. Chamber 16 communicates with each gate 15 by way of a respective sprue channel 18 (FIG. 1) having a transverse branch 18a and an axial branch 18b interconnected by an elbow-shaped passage 18c in a boss 19 which is integral with an end wall 20a of a valve cylinder 20 individual to each cavity. Channel 18 extends within a hot-runner structure comprising a distributing plate 22, bracketed by plates 10 and 11 but separated therefrom by an air gap 23, that structure further comprising a nozzle 24 with a body 24b surrounded by an electric heater 25 to which current is admitted by way of a cable 26. Nozzle 24 and heater 25 could be designed in conformity with our copending application Ser. No. 867,505 of even date, refiled July 12, 1979 under Ser. No. 056,855, though for present purposes it will be sufficient to consider the simplified arrangement illustrated. Nozzle 24 includes a tubular insert 27 of highly heat-conductive material, such as beryllium/copper, surrounding a terminal part of the axial channel branch 18b. An annular space existing between the nozzle body 24b, the insert 27 and the mold plate 12 is occupied by a sheath 28 of resinous material which may be prefabricated or is formed from the overflow of injected resin in the first operating cycle or cycles. The sheath 28 thermally insulates the downstream end of the nozzle body from the relatively cold mold plate 12.

Figure 2:
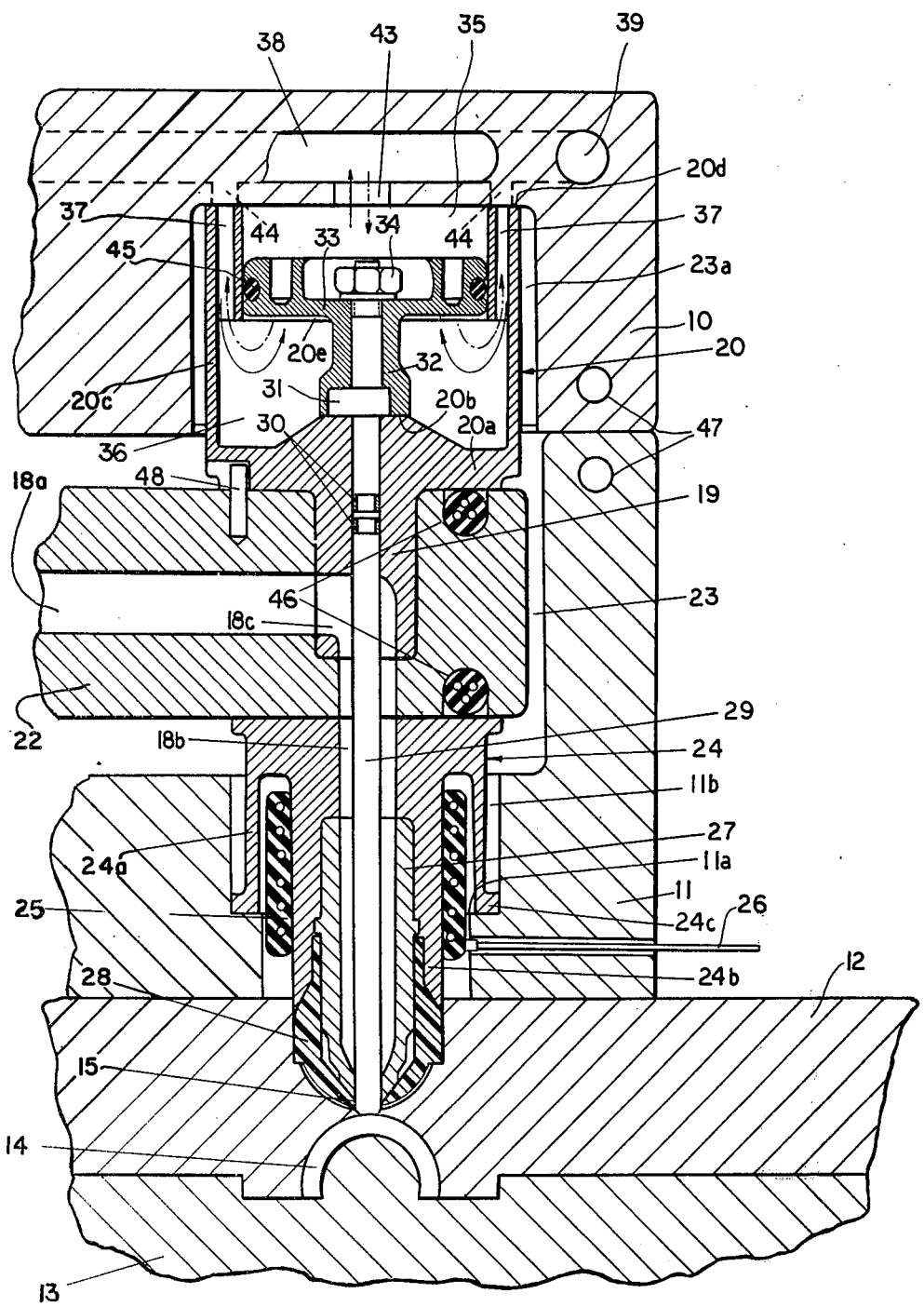
FIg. 2 is an enlarged fragmentary cross-sectional view taken on the line II—II of FIG. 1, illustrating an improved gate-valve assembly.

A steel rod 29 guided in cylinder wall 20a, boss 19 and insert 27 extends with all-around clearance within channel branch 18b and has a free end terminating at gate 15. Leakage of plastic material along the surface of rod 29 is minimized by the provision of sealing rings 30 contacting the wall of a bore of boss 19 in which the rod 29 is slidable. The end of the rod opposite gate 15 traverses a neck 32 of a piston head 33 to which it is secured by a nut 34. A key 31 received in a complementary recess of neck 32 maintains a fixed relative angular position between the rod and the piston. Neck 32, coming to rest against a plateau 20b of end wall 20a when the gate 15 is blocked by the rod 29, limits the downstroke of piston 32, 33 (as viewed in FIG. 2) to a small fraction of the axial height of cylinder 20 which is surrounded by an annular extension 23a of gap 23. The opposite, wide-open end of the cylinder forms an annular face 20d seated in a recess of cover plate 10, that face having a large central aperture 35 which gives access to piston head 33 and also enables its extraction. A pin 48 in plate 22 maintains a fixed relative angular position between that plate and cylinder 20.

The end of distributing plate 22 confronting the backing plate 11 across gap 23 is heated by a coil 46. Plates 10 and 11 are forcibly cooled by the circulation of water through internal passages some of which have been shown at 47.

The peripheral cylinder wall 20c is of reduced thickness, compared for example to that of end wall 20a, so as to be a very poor heat conductor. A skirt 24a of nozzle 24, having a similarly limited thickness, supports the distributor plate 22 on backing plate 11 which is in direct broad-face contact with cover plate 10. An external flange 24c on the face end of skirt 24a rests on a transverse shoulder 11a of an aperture 11b of plate 11, the remainder of the skirt being separated from the wall of that aperture. Thus, the elevated temperatures generated by the inherent heat of the oncoming plastic material in sprue channel 18a, 18b and by the heaters 25, 46 are essentially confined to the structure 22, 24 and to the adjacent end of cylinder 20 in the immediate vicinity of wall 20a.

Piston neck 32 is surrounded by an annular clearance 36 bounded in part by an internal shoulder 20e of wall 20c, this wall being of increased thickness between shoulder 20e and face 20d. Within that thickened wall portion we provide a pair of diametrically opposite, axially extending bores 37 opening into clearance 36 at shoulder 20e which is substantially flush with the undersurface of piston head 33 in the illustrated gate-closure position thereof.

Cover plate 10 is provided with a pair of conduits 38, 39 to which compressed air is alternately supplied from a non-illustrated blower or pump via a control valve 40 operable by a pair of solenoids 41, 42. Conduit 38 has branches extending to openings 43 on the axes of the several cylinders 20 which communicate with their access apertures 35 whereby air pressure in this conduit (broken arrows), generated in the illustrated left-hand position of valve 40, pushes all the piston heads 33 into their closure position shown in FIG. 2 to block the respective injection gates 15. Upon reversal of valve 40, compressed air in conduit 39 (solid arrows) passes through ports 44 into bores 37 of all cylinders 20 and thence into clearances 36 to retract the piston heads 33 into their alternate position adjacent cover plate 10, thereby unblocking the associated gates 15. It will be understood that the operation of control valve 40 is synchronized with the working cycle of the injection-molding machine, i.e. with the separation of mold plates 12, 13 to discharge a molded article from each cavity 14 and their subsequent re-engagement preparatorily to a new molding cycle.

Piston head 33 is shown provided with an O-ring 45 contacting the inner surface of the enlarged part of peripheral wall 20c in an airtight manner. Thanks to the thermal insulation provided by the long neck 32 and the reduced part of wall 20c, O-ring 45 is protected against deterioration due to excessive temperature.

Annular clearance 36 also serves as a repository for droolings of thermoplastic resin which may leak past the sealing rings 30. The large volume of this clearance obviates any need for frequent disassembly (with removal of nut 34) to clean out accumulated matter from the interior of cylinder 20.

It will be noted that cover or manifold plate 10 may limitedly shift relatively to cylinder 20, e.g. upon thermal expansion, without affecting the operation of the injection system, provided of course that ports 44 remain substantially aligned with bores 37.

We claim:
1. In an injection-molding machine including a hot-runner structure with a sprue channel for conveying liquefied plastic material from a pressure chamber to a plurality of heated nozzles, each nozzle defining an injection gate within a mold plate, and a like number of valves for alternately blocking and unblocking respective injection gates, the improvement wherein said structure comprises:
a distributing plate traversed by part of said sprue channel and provided with heating means for maintaining the fluidity of said plastic material;
a backing plate spaced from said distributing plate supporting said mold plate, each of said nozzles having a body spacedly surrounded by a thin-walled cylindrical skirt, said body traversing an aperture in said backing plate formed with a transverse shoulder, said skirt resting on said shoulder for holding said backing and distributing plates separated from each other;
heating means in the space between the body of each nozzle and the surrounding skirt, said heating means being in contact with said body but separated from said skirt; and
a cover plate spaced from said distributing plate on the side opposite said backing plate, said valves each including a thin-walled cylinder in line with the respective nozzle lodged in said cover plate and abutting said distributing plate for holding them separated with limited thermal contact therebetween, said valves and the skirts of said nozzles constituting the only support for said distributing plate on said backing and cover plates.

2. The improvement defined in claim 1 wherein said backing and cover plates contact each other at a location separated by an air space from said distributing plate.

3. The improvement defined in claim 1 or 2 wherein said cover plate is substantially square, one of said valves being disposed near each corner of said cover plate.

4. The improvement defined in claim 1 or 2 wherein said skirt has a free end with an external peripheral flange engaging said shoulder, the remainder of the skirt being spaced from the wall of said aperture.

* * * * *